UNITED STATES PATENT OFFICE.

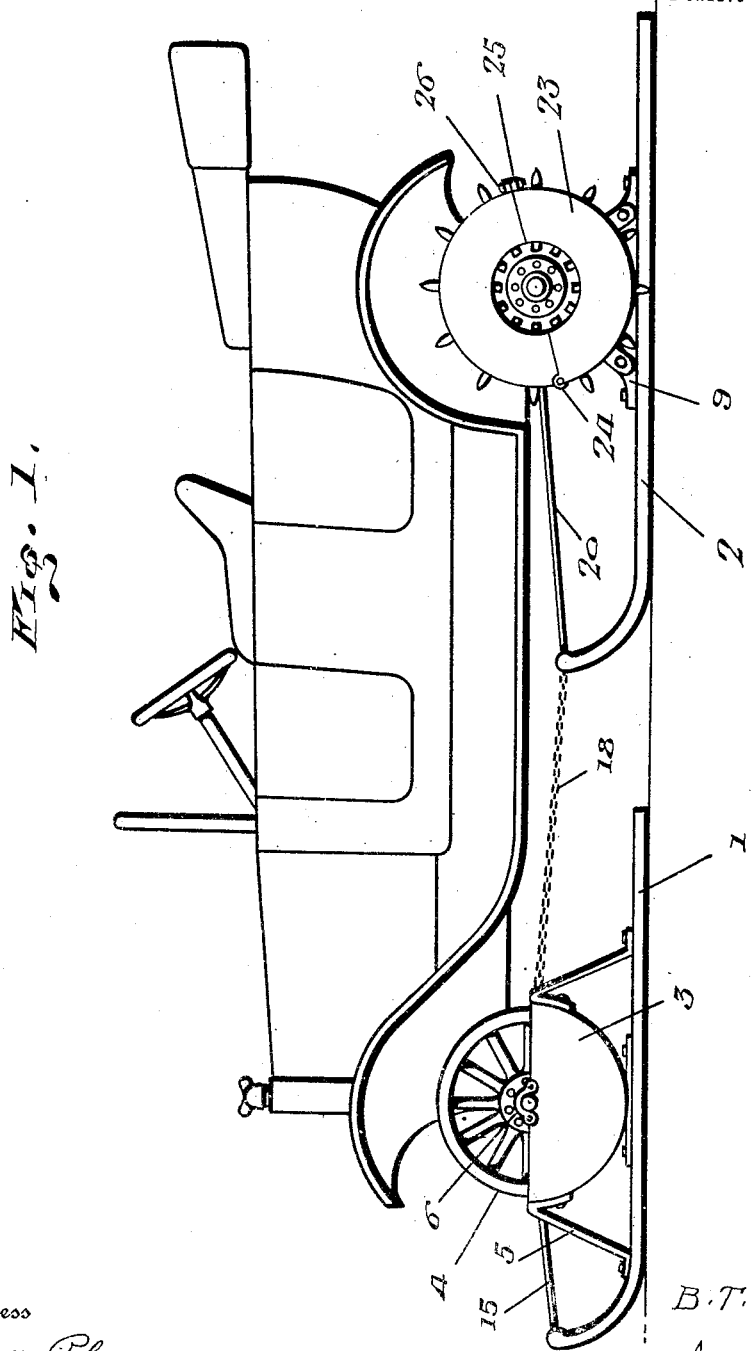

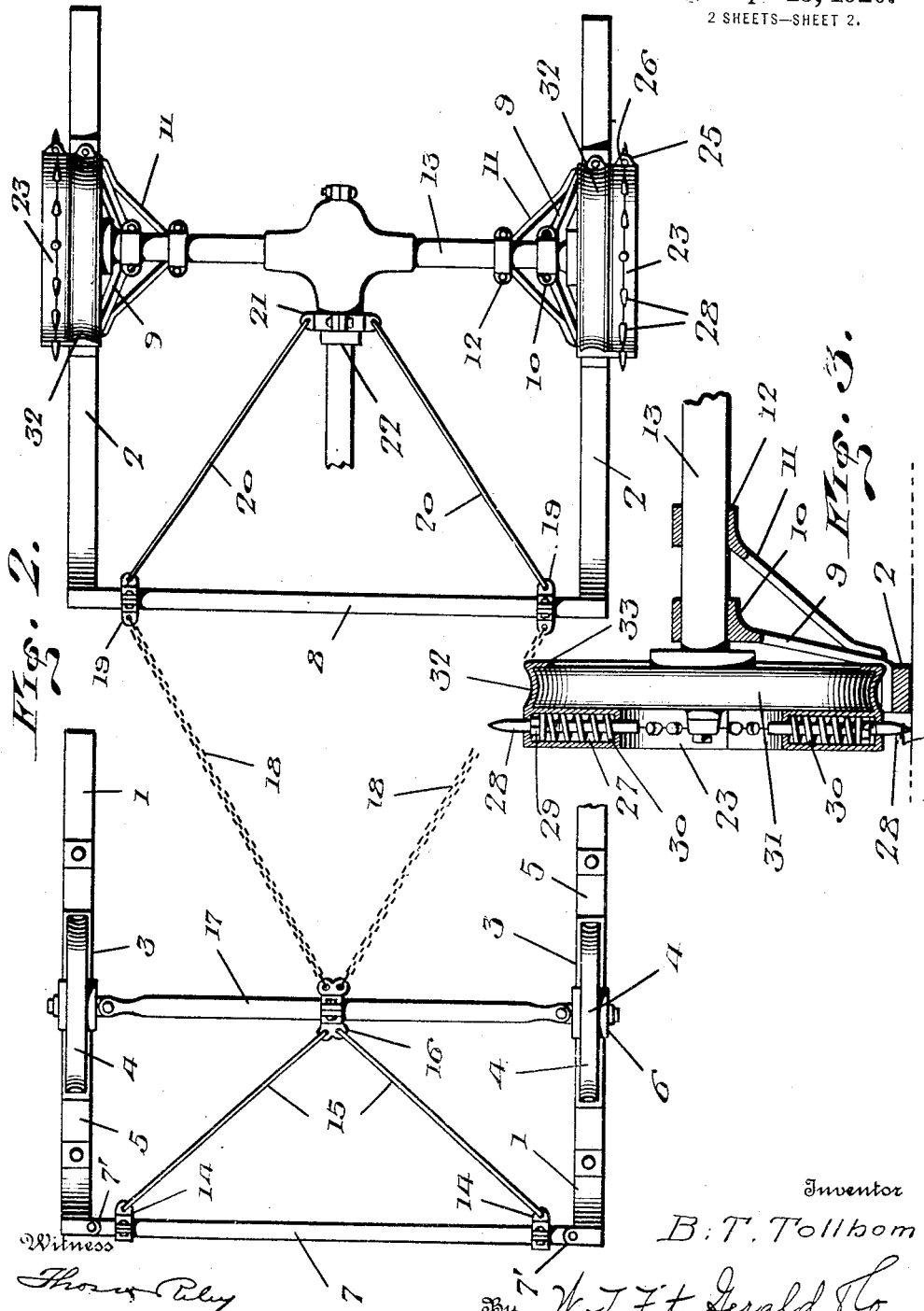

BERNHARD T. TOLLBOM, OF SAMUELS, IDAHO.

AUTOSLED.

1,336,448.

Specification of Letters Patent.

Patented Apr. 13, 1920.

Application filed September 16, 1919. Serial No. 324,145.

*To all whom it may concern:*

Be it known that I, BERNHARD T. TOLL-BOM, a subject of the King of Sweden, residing at Samuels, in the county of Bonner and State of Idaho, have invented certain new and useful Improvements in Autosleds; and I do hereby declare the following to be a full, clear, and exact description of the invention, such as will enable others skilled in the art to which it appertains to make and use the same.

The present invention relates to an auto sled, and aims to provide novel and improved, yet simple and inexpensive means for quickly converting an automobile into a sled for winter use, the construction being such that the sled structure can be quickly and easily applied to the automobile and also quickly removed, so that the machine can be used either way without requiring prohibitive trouble or alterations.

A further object is the provision of novel means for applying runners to the front wheels and rear axle, and providing for the quick application of the runners to and removal thereof from the automobile.

A still further object is to provide in combination with runners for supporting the rear axle, traction means which can be quickly applied and removed from the rear wheels for the propulsion of the machine when used as a sled.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the sled attachment as applied to an automobile.

Fig. 2 is a plan view of the sled attachment, portions being broken away.

Fig. 3 is a diametrical section of one of the traction devices.

The sled comprises a pair of front runners 1, and a pair of rear runners 2, which are applied to the front wheels and rear axle of the automobile.

As a simple and convenient means for applying the front runners 1 to the automobile, semi-circular pockets 3 are secured on the runners 1, for receiving and holding the lower portions of the front wheels 4, from which the tires have been removed. These pockets 3 are secured to the runners by braces 5, and it is preferable to connect the hubs of the wheels 4 to said pockets 3 by means of suitable clamps 6. The runners 1 are thus firmly applied to the front wheels, so as to be capable of oscillation with said front wheels in passing over uneven surfaces and, furthermore, the runners can be angled for steering the sled. The forward ends of the runners 4 are connected by a cross bar 7 which has its ends pivotally connected to the forward ends of said runners as at 7'. This permits the runners to turn about the vertical pivots of the steering knuckles of the wheels 4.

The forward ends of the rear runners 2 are connected rigidly by a cross bar 8, and said rear runners have standards 9 provided with clamps 10 at their upper ends, and said standards are also provided with inwardly inclined braces 11 also having clamps 12. These clamps 10 and 12 are adapted to loosely embrace the rear axle housing 13, so as to support the rear end of the machine from the runners 2, and permit said runners to oscillate about the rear axle. The braces 11 will prevent transverse tilting of the runners.

In order to connect the runners flexibly with one another, and with the machine, clamps 14 loosely embrace the cross bar 7 so as to permit said cross bar to slide therethrough, and rearwardly converging rods 15 have their forward ends loosely connected to the clamps 14 and their rear ends loosely connected to a clamp 16 adapted to tightly embrace the front axle 17. Chains or other flexible element 18 are connected to the clamp 16 and diverge rearwardly, and their rear ends are connected to clamps 19 embracing the rear cross bar 8. Rearwardly converging rods 20 have their forward ends loosely engaging the clamps 19, and their rear ends loosely engaging a clamp 21 to embrace the propeller shaft housing 22. These rods and chains provide for flexible connection between the cross bars of the runners and the axle structures of the machine, whereby the runners are permitted to oscillate a limited amount, but the connections will serve to render the sled less apt to get out of order by undue movement of any of the parts or unexpected strain.

In combination with the rear runners and means for supporting the rear axle therefrom, traction devices are used upon the rear wheels, for propelling the sled. Each of these devices include a ring 23 to be disposed at the outer side of the rear wheel and divided on a diametrical line into two arcuate or semi-circular sections, which are hinged together at one of their adjacent ends, as at 24, so that they can be swung apart in applying and removing the device. The opposite ends of the sections of the ring 23 have outstanding lugs 25 which are secured together by a bolt 26 or the like, to hold the sections of the rings together. This ring 23 has radial bores 27 therein, and radial rods 28 are slidable through said ring and extend through said bores. The inner and outer ends of said rods project from the inner and outer edges of said ring, and the outer ends are preferably sharpened, so as to engage the ice or surface over which the runners pass to facilitate traction. Said rods are slidable radially so as to be capable of outward movement to engage the ice or ground, and to yield inwardly when necessary. Nuts or collars 29 are secured on said rods within the bores 27, to limit the outward movement of said rods, and coiled expansion springs 30 are disposed in said bores and are confined between the nuts 29 and inner ends of said bores to yieldably project said rods for engagement with the ice or ground. Said springs permit the rods to yield inwardly when necessary, thereby forcing said rods into tensioned engagement with the ice or surface underneath.

The ring 23 is applied to the rear wheel from which the tire has been removed, leaving the rim 31 exposed. The ring 23 has an annular marginal flange 32 extending inwardly to surround the rim 31 of the rear wheel, and said flange 32 is preferably concaved transversely to fit within said rim, and thus serves to hold the ring 23 against the wheel. This is also assisted by inwardly extending lip 33 with which the flange 32 is provided to overlap the inner edge of the rim and felly. The flange 32 is divided similar to the ring, so that when the sections of the ring are swung apart, the flange 32 can be readily moved over or off of the wheel, and when moved over the wheel and sections of the ring swung together and secured, this will firmly clamp the ring 23 on the rear wheel to turn therewith for propelling the sled. The bolts or clamping means 26 of the rings in being tightened will cause the flanges 32 to tightly embrace the rim 31, thereby not only holding the ring 23 against the outer side of the wheel, but causing said ring to turn with the wheel.

The automobile can be quickly converted into a sled, by jacking up the machine and removing the tires. The runners can then be moved into place, and the traction devices applied to the rear wheels. The machine is then let down onto the runners, and is ready for use as a sled. The sled attachment can be quickly removed by jacking up the machine and removing the runners and traction devices, which changes, either way, require but a short time to make.

Having thus described the invention, what is claimed as new :—

1. A sled attachment for an automobile including a pair of front runners, a pair of rear runners, cross bars connecting the forward ends of the runners, a pair of clamps on each cross bar, a clamp to embrace the front axle of the automobile, a clamp to embrace the housing of the rear axle construction, rearwardly-converging rods connected loosely to the clamps of the cross bars, and to the respective axle and housing clamps in rear of said cross bars, and rearwardly-diverging flexible elements connected to the front axle clamp and to the clamps of the cross bar of the rear runners.

2. A sled attachment for an automobile including a rear runner, means carried by the runner for supporting the rear axle housing, a ring to be disposed at the outer side of a rear wheel of the automobile and divided into sections, means for clamping said sections together, said ring having an inwardly extending annular flange to embrace the rim of said wheel, and yieldable traction rods slidable in said ring and extending therefrom.

3. A sled attachment for an automobile including a traction ring to be disposed at the outer side of one rear wheel, said ring consisting of hinged sections, means for clamping said sections together, said ring having an inwardly extending annular flange to embrace the rim of said wheel, and said flange having an inwardly extending lip to overlap the inner side of said rim, radial traction rods slidable in said ring and extending therefrom, and spring means for moving said rods outwardly.

In testimony whereof I have signed my name to this specification in the presence of two subscribing witnesses.

BERNHARD T. TOLLBOM.

Witnesses:
  Oscar J. Bandelin,
  Charles Blum.